Aug. 28, 1923.
A. F. STOELTING
MILK CAN
Filed Nov. 8, 1921
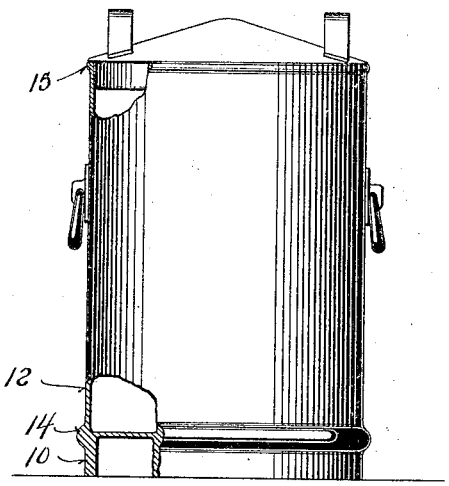
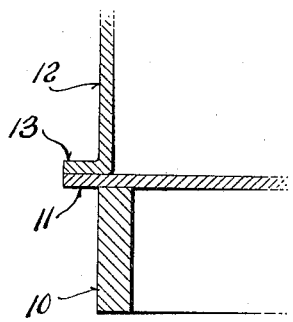
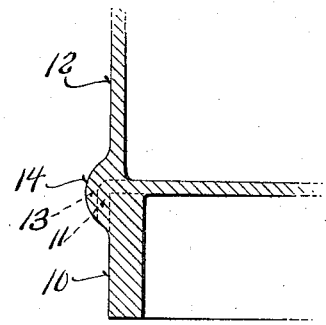
Inventor:
Adolph F. Stoelting Patented Aug. 28, 1923.

1,466,515

UNITED STATES PATENT OFFICE.

ADOLPH F. STOELTING, OF KIEL, WISCONSIN, ASSIGNOR TO STOELTING BROS. COMPANY, OF KIEL, WISCONSIN, A CORPORATION OF WISCONSIN.

MILK CAN.

Application filed November 8, 1921. Serial No. 513,836.

*To all whom it may concern:*

Be it known that I, ADOLPH F. STOELTING, a citizen of the United States, and resident of Kiel, in the county of Manitowoc and State of Wisconsin, have invented certain new and useful Improvements in Milk Cans; and I do hereby declare that the following is a full, clear, and exact description thereof.

My invention is an improvement in milk cans. It contemplates a bottom structure of extraordinary strength and capable of retaining its shape indefinitely.

It is provided with a strong hoop which is integrally united with a horizontal bottom member and the lower edge of the cylindrical sides of the container. The hoop, bottom and sides are united by welding with the result that an annular bead is formed on the exterior surface. From this structure results a maximum of strength and durability, and the character of the welded union is such as to preclude all possibility of leakage.

A very important feature of my invention is the simplicity of construction of the bottom. This involves merely the assembling of a hoop, a disk like bottom member placed thereon, and a cylindrical container member having an outwardly directed flange. After these members are assembled together, their contacting portions are welded together.

Another important feature of my invention is the union with the top of the can of a hoop welded thereto, to impart strength and rigidity and adapted in union with the cover to effectively prevent the slopping out of milk.

Other objects will appear as the description proceeds.

Reference is had to the accompanying drawings, in which,

Figure 1 shows a side elevation with portions of the top and bottom in section.

Figure 2 is a cross section of the bottom with parts broken away showing the manner of assembling of parts properly to weld, and Figure 3 is a cross section of the parts shown in Figure 2 after the welding operation.

Shown in Figure 2 is a heavy hoop 10, made in any preferred manner. If desired, it may be stamped out of heavy wrought iron plate. Resting upon the top of hoop 10, is a disk shaped bottom member 11. Cylindrical member 12 rests thereupon, and has an outwardly directed flange 13 terminating at the end of bottom member 11. This is the position of the parts prior to the welding operation. After this operation, the structure shown in Figure 3 results.

During the process, pressure applied to flange 13 and the outer edge of bottom member 11 results in the formation of an annular bead 14. The position taken by the edge of bottom member 11 is indicated in dotted lines.

Shown in Figure 1 is a reinforced member 15 encircling the top of container 12. In forming this reinforcing member, a hoop is placed upon container 12 and welded thereto.

It is apparent that the bottom structure results in a maximum strength, the bracing force of annular bead 14 cooperating with the strength of hoop 10.

It is clear also, that all danger of leakage is effectually prevented.

I claim:

The method of constructing the bottom of a container consisting of assembling a hoop, a disc member having an edge extending circumferentially beyond said hoop and the outwardly directed flange of a cylindrical member, bending the edge of the disc and the flange downwardly over said hoop, and welding the hoop, the flange, and the edge of the disc together so as to form an annular bead.

In testimony that I claim the foregoing I have hereunto set my hand at Kiel, in the county of Manitowoc and State of Wisconsin.

ADOLPH F. STOELTING.